US006441781B1

(12) United States Patent
Rog et al.

(10) Patent No.: US 6,441,781 B1
(45) Date of Patent: Aug. 27, 2002

(54) DIGITAL CORRELATOR FOR A RECEPTOR OF SIGNALS FROM SATELLITE RADIO-NAVIGATION SYSTEMS

(75) Inventors: Andrey Leonidovich Rog, Moscow; Boris Dmitrievich Fedotov, Saint-Petersburg; Vladimir N. Ivanov, Saint-Petersburg; Alexander N. Korotkov, Saint-Petersburg; Viktor I. Malashin, Saint-Petersburg; Serguey B. Pisarev, Saint-Petersburg; Denis G. Poverennyi, Saint-Petersburg; Boris V. Shebshaevich, Saint-Petersburg; Mikhail P. Soshin, Saint-Petersburg, all of (RU)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/600,072

(22) PCT Filed: Nov. 11, 1998

(86) PCT No.: PCT/RU98/00370

§ 371 (c)(1),
(2), (4) Date: Sep. 5, 2000

(87) PCT Pub. No.: WO00/28346

PCT Pub. Date: May 18, 2000

(51) Int. Cl.$^7$ .......................... H04B 7/185; H04B 1/06; H04L 27/30
(52) U.S. Cl. .................... 342/357.12; 455/269; 375/136
(58) Field of Search ................ 342/112–113, 115–116, 342/127–132, 350, 352, 357.01–357.04, 357.06, 357.09, 357.12, 357.15, 358, 378, 385, 421, 394–395, 450, 457; 375/130, 140, 136–137, 144, 340, 147–150, 316–326, 327–332, 334–335, 342–346, 349–350, 365–369, 371, 373, 375–376; 370/515–519; 701/200, 207, 213, 215; 455/130, 150.1, 296, 269

(56) References Cited

U.S. PATENT DOCUMENTS

| 5,192,957 | A |   | 3/1993  | Kennedy |
| 5,808,582 | A |   | 9/1998  | Woo |
| 5,999,561 | A | * | 12/1999 | Naden et al. ............... 375/142 |
| 6,075,987 | A | * | 6/2000  | Camp, Jr. et al. .......... 455/427 |

FOREIGN PATENT DOCUMENTS

EP    0501829    9/1992

OTHER PUBLICATIONS

Novak, "Statistical Analysis of High–Accuracy measurement of Radio–Frequency Carrier Signals from DFT Spectra", Jun. 1990, Precision Electromagnetic Measurements, 1990, pp. 434–435.*

Riley et al S.A. cobined GPS/GLONASS high precision recever for spase applications. Palm Springs, CA, US, Sep. 12–15, 1995, p. 835–844.

Poisk, obnaruzhenie i izmerenie parametrov signalov v radionavigatsionnykh sistemakh. "Under editorship" Kazarinova, M., "Sovetskoe radio", 1975, p. 116.

* cited by examiner

Primary Examiner—William A. Cuchlinski, Jr.
Assistant Examiner—Thu Nguyen
(74) Attorney, Agent, or Firm—Sughrue Mion, PLLC

(57) ABSTRACT

Digital correlator of a receiver for reception of signals of satellite radio navigation systems which has one or more decision making unit(s) generating detection signals indicative of a strength of the received signals of satellite radio navigation systems, whereby a fast search is performed for detection of strong signals, and a slow search is performed only when signals were not detected during the fast search.

4 Claims, 6 Drawing Sheets

DIGITAL CORRELATOR FOR A RECEPTOR OF SIGNALS FROM SATELLITE RADIO-NAVIGATION SYSTEMS

FIELD OF TECHNOLOGY

The invention relates to radio navigation and, more specifically, it relates to digital correlators of receivers used for reception of the pseudo-noise signals of the satellite radio navigation systems (SRNS) GPS (USA) and GLONASS (Russia) performing simultaneous reception of the signals of the C/A codes of these systems in the L1 frequency range.

STATE OF THE ART

The receivers of pseudo-noise (noise-like) signals of the SRNS GLONASS (cf. "Global Navigational Satellite System—GLONASS. Interface Control Document. KNITS VKS Russia ", 1995) [1] and GPS (cf. "Global Position System. Standard Positioning Service. Signal Specification." USA, 1993) [2] are now widely used for establishing the coordinates (latitude, longitude, height), speed of objects, and time. The fundamental distinctions between the SRNS GPS and the GLONASS consist in the use of different, although adjacent, frequencies on the L1 band, use of different pseudo-noise modulating codes and use of both code and frequency division of signals of the different satellites in the system. Thus, during operation on the L1 frequency band the SRNS GPS satellites transmit signals modulated by different pseudo-noise codes on one carrier frequency 1575.42 MHz while the SRNS GLONASS satellites transmit signals modulated by the same pseudo-noise code on different carrier (letter) frequencies laying in the adjacent frequency zone.

The distinctions existing between the SRNS GPS and GLONASS signals stipulated by the code division in the SRNS GPS and the frequency division in the SRNS GLONASS result in different hardware used for reception and correlation processing of these SRNS signals to allow one to carry out the radio navigation measurements.

The typical SRNS receiver operates with a complex noise-like signal (NLS) consisting of a plurality of radio signals radiated by the SRNS satellites, a noise component, as well as a component due to the interference caused by the repeated reflection of the signals from various surface areas, buildings, etc.

Known in the art is a SRNS GPS receiver of pseudo-noise signals (cf. FIG. 1 in the "Global Positioning System (GPS) Receiver RF Front End. Analog-Digital Converter", Rockwell International Proprietary Information Order Number. May 31, 1995) [3], comprising a radio-frequency converter including a low-noise amplifier, a filter, a first mixer, a first intermediate frequency amplifier, a quadrature mixer, two quantizers for the inphase and quadrature channels, a signal shaper producing a first heterodyne frequency (1401.51 MHz), a divider producing a signal of a second heterodyne frequency from the signal of the first heterodyne frequency, and a correlation processing unit. The device solves a technical problem of reception and correlation processing of the SRNS GPS signal for the purpose of consequent radio navigation measurements, however, it does not allow one to solve the problem of reception and correlation processing of the SRNS GLONASS signals.

Also known in the art (cf. FIG. 9.2 on pages 146–148 in the book "Network Satellite Systems", by V. S. Shebshaevich, P P. Dmitriev, N. V. Ivantsevich, et all. Moscow, "Radio i Syaz", 1993)[4] a receiver of the SRNS GLONASS pseudo-noise signals ("Single-Channel Users' Equipment 'ACH-37' for the GLONASS Systems"). The receiver comprises an antenna, a low-noise amplifier/converter, a radio-frequency converter, a digital processing device, and a navigational processor. The low-noise amplifier/converter includes band-pass filters, an amplifier and a mixer. The radio-frequency converter includes an amplifier, a phase demodulator, a second mixer, a limiter and a lettered frequency synthesizer operating on the signals of a reference generator. The device includes a pseudorandom sequence generator (PSG) with a digital clock-signal generator of the PSG, a digital Doppler carrier drift generator, and a phase-code converter with a storage unit for storing the digital samples. The lettered frequency synthesizer generates output signals according to the lettered frequencies of the received SRNS GLONASS signals. The spacing of the lettered frequencies generated by the synthesizer is equal to 0.125 MHz. The first heterodyne frequency signal is produced by multiplying the synthesizer output signal by four while the second heterodyne frequency signal is produced by dividing the frequency at the output of the frequency synthesizer by two. The receiver solves the technical problem of reception and correlation processing of the SRNS GLONASS signals to provide the consequent radio navigation measurements and positioning, however, it does not allow one to solve the problem of reception and correlation processing of the SRNS GPS signals.

In spite of the difference existing between the SRNS GPS and GLONASS, their similarity on designation, ballistic build-up of the orbital groups of satellites and used frequency range allows one to formulate and solve the problems associated with the creation of the receivers capable of processing the signals of these two systems. The result achieved consists in a high reliability, authenticity and accuracy of defining the location of an object, in particular, due to a possibility of selecting a working constellations of satellites with the best geometrical parameters [4, page 160].

Known in the art among the devices performing the reception and correlation processing of the SRNS GPS and GLONASS signals is a receiver of SRNS GPS and GLONASS signals operating in the L1 frequency range, described in ([4], page 158–161, FIG. 9.8). The receiver comprises an antenna, a radio-frequency converter, a reference generator and a processor for primary processing. The radio-frequency converter comprises a dupleyer performing frequency division of the SRNS GPS and GLONASS signals, band-pass filters and amplifiers of the GPS and GLONASS channels, a mixer, a switch applying the SRNS GPS or GLONASS signals to the signal input of the mixer, a switch applying the first heterodyne signal to the reference input mixer for the GPS channel or the GLONASS channel. Due to the respective frequency shaping of the heterodyne signal, the first intermediate frequency is constant for the SRNS GPS and GLONASS signals and all subsequent operations of signal processing are common for both systems. The processor for primary signal processing includes a multiplexer with a ROM unit, a digital generator of lettered frequencies, a digital correlator, a PSG generator and a microprocessor. A disadvantage of this device is that the reception, conversion and correlation signal processing of each SRNS is carried out in sequence.

Also known in the art is a receiver of the SRNS GPS and GLONASS signals in the L1 frequency range (cf. "Riley S., Howard N., Aardoom E., Daly P., Silvestrin P. "A Combined GPS/GLONASS High Precision Receiver for Space Applications", Palm Springs, CA, US, Sept. 12–15, 1995, pp.835–844) [5], which solves the problem of simultaneous reception of signals of both types of SRNS and the parallel correlation processing of these signals. The receiver of SRNS signals described in [5] comprises an antenna, a radio-frequency converter with a digitizer and N digital correlators connected in series. The receiver described in [5], performs procedures of reception, search (detection) and tracing of signals typical for the SRNS receivers. These procedures consist in the following. For detection, tracing and determination of parameters of the received SRNS signals, these signals are amplified, converted into IF-signals and digitized in the radio-frequency unit of the receiver and, finally, the signals are demodulated using the digital correlation technique in the N correlators processing the signals of individual SRNS satellites. The typical procedures performed by the digital correlator of the SRNS signal receiver consist in correlation of the received NLS signal by multiplying its digital readouts by the local copy of the sought signal generated inside the correlator, and storage of the correlation results during a definite time spacing. As a rule, this spacing is 1 millisecond, that is equal to the length of the pseudorandom code sequence (PSG) of C/A code of the SRNS GPS and GLONASS. The closure of the loop of tracing the frequency (phase) and delay of the PSG code of the satellite SRNS signal being processed is carried out with the help of a processor. The processor reads out the information from the respective memory of the correlator, processes the information with the help of suitable programs and produces feedback control signals thus closing the tracing loops. In so doing, to perform the code tracing (code delay), use is made of the results of correlation of the input signal with early (advance) and late (delayed) copies of the input signal, or with a difference (early-minus-late) copy. The procedure of tracing the code (code delay) is used at the initial step of search (detection) of the signal. The search (detection) of signals in the SRNS receiver is carried out by two parameters: delay and frequency. The combination of positions of search by frequency and delay defines a search area (FIG. 1). Depending on an apriori information on the Doppler frequency shift, the structure of the systems for tracing the frequency and delay, reference generator stability and other parameters, number of positions of searching by frequency can vary in a wide range from one position up to several dozens. The number of positions by delay is determined by the spacing of uncertainty and in the worst case is equal to double the number of PSG digits per period. The search of signals in the SRNS receiver is carried out under conditions of a wide dynamic range of change of the input signal power level. This range depends on the location of the SRNS satellite, propagation losses, type of the directional pattern and other additional factors. In fact, the range of change of the power of the input signals of the SRNS receivers is within 25 dB. The process of searching the signal of an SRNS satellite realized in the digital correlator of the SRNS signal receiver consists of a sequential selection of all positions of the search area (FIG. 1) and comparison with a given detection threshold, which is determined stemming from the given probabilities of the skip and false alarm, thus the detection threshold is calculated based on the least signal level. The decision on the absence or presence of a signal in a given position is based on the results of study of a concrete position (FIG. 1).

A traditional decision is that the storage (at a spacing of 1 ms) in the digital correlator of the SRNS receiver is effected by means of hardware, and the decision on the presence or absence of a signal is made by the processor, i.e. at a software level. The digital correlator of the receiver of the SRNS GPS and GLONASS signals, making such a decision and described in [5], is taken as a prior art. The block diagram of the prior art system is shown in FIG. 2.

The digital correlator of the SRNS signal receiver, chosen as a prior art, comprises (FIG. 2) a switch 1 for switching the input signals, a data exchange unit 2, a processor 3, a first 4, a second 5, a third 6 and a fourth 7 storage units; a digital carrier generator 8; a control register 9; a digital code generator 10; a generator 11 of reference C/A code of the SRNS GPS/GLONASS; a programmable delay line 12; a first 13 and a second 14 digital mixers, respectively, of the inphase and quadrature channels of correlation processing; a first 15, a second 16, a third 17 and a fourth 18 demodulators. The first and second signal inputs of the input signals switch 1 (the inputs GPS and GLONASS) constitute signal inputs of the digital correlator. The clock inputs of the storage units 4–7, of the digital code generator 10, of the digital carrier generator 8 and of the programmable delay line 12 form a clock input of the digital correlator. The signal inputs of the digital correlator (i.e. the signal inputs of the switch 1) are connected to the outputs of the radio-frequency converter (not shown in FIG. 2), in which the received SRNS GPS and GLONASS signals are converted into a second intermediate frequency, the signals are subjected to 4-bit analog-to-digital conversion at a clock frequency of $F_T$=57.0 MHz (4×14.25 MHz), and two-bit samples of the inphase (I) and quadrature (Q) components of the SRNS GPS and GLONASS signals are shaped with a sampling rate twice as low as $F_T$, i.e. equal to 28.5 MHz (2×14.25 MHz), where 14.25 MHz is the average frequency of SRNS GPS and GLONASS signals on the second intermediate frequency. The digital correlator clock input is connected to the signal output $F_T/2$ of the radio-frequency converter. The data exchange unit 2 is connected through data buses to the processor 3, to the outputs of the storage units 4–7, and to the control inputs of the digital carrier generator 8, control register 9, digital code generator 10 and reference generator 11 of the C/A code of the SRNS GPS and GLONASS. The control input of the input signal switch 1 is connected to the first output of the control register 9, and the switch output is connected to the first inputs of the digital mixers 13 and 14 of the inphase and quadrature channels of correlation processing. The second inputs of the digital mixers 13 and 14 are connected respectively to the "cosine" and "sine" outputs of the digital carrier generator 8 while the outputs are connected to the junction between the first inputs of the first 15 and second 16 demodulators and to the junction between the first inputs of the third 17 and fourth 18 demodulators whose outputs are connected respectively to the signal inputs of the first 4, second 5, third 6 and fourth 7 storage units. The second inputs of the first 15 and fourth 18 demodulators are connected to the output of the punctual (exact) "P" copy of the reference C/A code of the programmable delay line 12. The second inputs of the second 16 and third 17 demodulators are connected to the output of the difference "E–L" copy or the early "E" copy of the reference C/A code of the programmable delay line 12. The signal input of the programmable delay line 12 is connected to the output of the generator 11 of the reference C/A code of the SRNS GPS and GLONASS, whose signal input is connected to the output of the digital code generator 10. The control input of the generator 11 of the reference C/A code of the SRNS GPS and GLONASS C/A radio navigation systems and the control input of the programmable delay line 12 are connected, respectively, to the first and second outputs of the control register 9. The digital correlator of the SRNS signal receiver, accepted as a prior art operates as follows. Applied to the GPS and GLONASS inputs of the switch 1 switching the input signals 4 are two-bit samples (I) and quadrature (Q) components of the SRNS GPS and GLONASS signals, respectively, at a sampling rate of $F_T/2$ (28.5 MHz). Following the command of the processor 3 transmitted to the control register 9 through the data exchange unit 2, the switch 1 of the input signals 4 connects to its output the two-bit quadrature signals (I and Q) of the SRNS GPS or GLONASS. These signals are applied to the first inputs of the digital mixers 13 and 14 whose second inputs are fed with the signals "COS" and "SIN" at a reference frequency from the respective outputs of the digital carrier generator 8. The digital carrier generator 8 generates "SIN" and "COS" signals of the intermediate frequency of a given SRNS GLONASS letter, whose binary code is given by the processor 3, or of the intermediate frequency of SRNS GPS signals. With the sampling rate of $F_T/2$ =28.5 MHz, the values of intermediate frequencies of the SRNS GPS or GLONASS signals laying in a range of 14.25 MHz. The digital mixers 13 and 14 recover the signals of a given letter of the SRNS GLONASS signals or the satellites SRNS GPS signals and transfer the spectra of these signals into the fundamental frequency band (on a zero-point frequency). From the outputs of the digital mixers 13 and 14 signals are applied to the first inputs of the demodulators 15, 16 and 17, 18. Applied to the second inputs of the demodulators 15, 18 and 16, 17 are the punctual copy "P" and difference copy "E-L" (Early-Late) or early copy "E". The digital demodulators 15, 18 and 16, 17 perform correlation of the received signals with punctual (exact) "P" and difference "E-L" (Early-Late) or early "E" copies of the reference C/A code of the SRNS GPS or GLONASS respectively. These copies of the code are produced by the programmable delay line 12, which allows the spacing between the early and late copies of the C/A code to be changed from 0.1 to 1 length of the digit of the C/A code and, therefore, to shape a "narrow discriminator" in the system for tracing the code of the SRNS receiver. The programmable delay line 12 responses to the signals fed from the output of the reference C/A code generator 11 of the SRNS GPS/GLONASS, shaping reference pseudorandom C/A codes of the SRNS GPS or GLONASS satellites. The signal of a clock rate 1.023 MHz necessary for operation of the generator 11 of the GPS or 0.511 MHz for the GLONASS is applied to its signal input from the output of the digital code generator 10. The selection of the produced pseudorandom code sequence and the code clock rate values is carried out by the commands of the processor 3 transmitted through the data exchange unit 2. The results of correlation of the signals are stored in the storage units 4–7. For the case of operation with punctual and difference copies of an input signal the unit 4 stores the quadrature component of correlation of the punctual copy of a signal Qp, the unit 5 stores the quadrature component of correlation of the difference copy Qd, the unit 7 stores the inphase component of the punctual copy Ip, the unit 6 stores the inphase component of the difference copy Id. The data stored in the storage units 4–7 are periodically read out by means of the data exchange unit 2 controlled by the processor 3, in which are realized all algorithms of signal processing, i.e. algorithms of searching the signals, tracing the carrier code, and receiving the service information. The storage period is equal to the C/A code period, i.e. to 1 ms. Using the signal processing results, the processor 3 controls the digital correlator, giving out the carrier frequency estimated values to the digital carrier generator 8 and the sending the code clock rate to the digital code generator 10.

Thus, the data storage at a 1 ms spacing is effected by the hardware in the digital correlator of the SRNS signal receiver, taken as a prior art, while the decision on the presence or absence of a signal is made by the processor 3, i.e. on the software basis.

The use of the given structure is expedient for the navigational equipment, in which all operational resources of the calculator (processor) are used for solving the purely navigational problems—positioning by means of the SRNS satellites signals, which is performed in the SRNS receiver described in [5]. However, such a solution does not allow one to render additional services to the user, for example, it is not suitable for a design of a small-size cellular telephone equipped with an element for emergency announcement of an extreme situation with transmission of the location data.

SUMMARY OF THE INVENTION

The technical result to be achieved by this invention is a use of one calculator (processor) both for solving the problem of location and maintenance of communication by unloading the processor of the digital correlator of the SRNS signal receiver, when searching the signals by using an additional operation of "fast search" in the correlator hardware. For example, under conditions of transmission of an emergency message the processor should process the navigational information (to perform the search of the signals and make radio navigation measurements), as well as to generate and transmit the communication information (to perform "conversation processing") and also to control the transmitted message, etc.). To realize such a mode, the processor operation should be optimized (processor should be "unloaded"). In a majority of real cases of solving the navigational problem, the time of search of the SRNS signals is reduced, the processor is unloaded and can be used for performing other tasks, for example, those associated with the integration.

According to the present invention a digital correlator of the signal receiver of satellite radio navigational systems (SRNS)includes a switch for switching the input signals, whose inputs form signal inputs of the digital correlator, a data exchange unit connected through a suitable data bus to the processor and to the outputs of a first, a second, a third and a fourth storage units controlling the inputs of a digital carrier generator, a digital code generator, and a reference C/A code generator of the SRNS GPS/GLONASS system. The clock inputs of the storage units, of the digital code generator, of the digital carrier generator and of the programmable delay line form a clock input of the digital correlator. The control input of the switch is connected to the first output of the control register. The output of the input signal switch is connected to the first inputs of the first and second digital mixers, respectively, of the inphase and quadrature correlation processing channels whose second inputs are connected, respectively, to the "cosine" and "sine" outputs of the digital carrier generator. The outputs of the first and second digital mixers are connected to the junction between the first inputs of the first and second demodulators and to the junction between the first inputs of the third and fourth demodulators whose outputs are connected, respectively, to signal inputs of the first, second, third and fourth storage unit. The second inputs of the first and fourth demodulators are connected to the output of the punctual (exact) copy "P" of the reference C/A code of the programmable delay line, the second inputs of the second and third demodulators are connected to the output of the difference "E-L" or early "E" copy of the reference C/A code of the programmable delay line, the signal input of the programmable delay line is connected to the output of the reference C/A code generator of the SRNS GPS/GLONASS, the generator signal input being connected to the output of the digital code generator; the control input of the reference C/A code generator of the SRNS GPS/GLONASS and the control input of the programmable delay line being connected, respectively, to the first and second outputs of the control register. According to the present invention, the digital correlator further comprises first and second decision making units whose control inputs and outputs are connected through suitable buses to the data exchange unit. The first and second signal inputs of the first decision making unit are connected, respectively, to the outputs of the second and third storage units. The first and second signal inputs of the second decision making unit are connected, respectively, to the outputs of the first and fourth storage units. In a preferred embodiment of the invention, each decision making unit comprises: first and second modulus determining deices whose inputs form, respectively, first and second signal inputs of the decision making unit; an adder whose inputs are connected to the outputs of modulus determining devices; a threshold register whose input forms a control input of the decision making unit; a first, a second and a third threshold devices, whose signal inputs are connected, respectively, to the output of the adder and to the outputs of the first and second modulus determining devices; the reference input of the first threshold device is connected to the first output of the threshold register, the reference inputs of the second and third threshold devices are connected to the second output of the threshold register, the outputs of the threshold devices through an "OR" circuit are connected to the input of the output register whose output is in fact the output of the decision making unit.

BRIEF DESCRIPTION OF THE DRAWINGS

The essence of the claimed invention, a possibility of its realization and industrial applicability are illustrated in the drawings and diagrams in FIGS. 1–6, in which:

DETAILED DESCRIPTION OF A PREFERRED EMBODIMENT OF THE INVENTION

Figure 1:
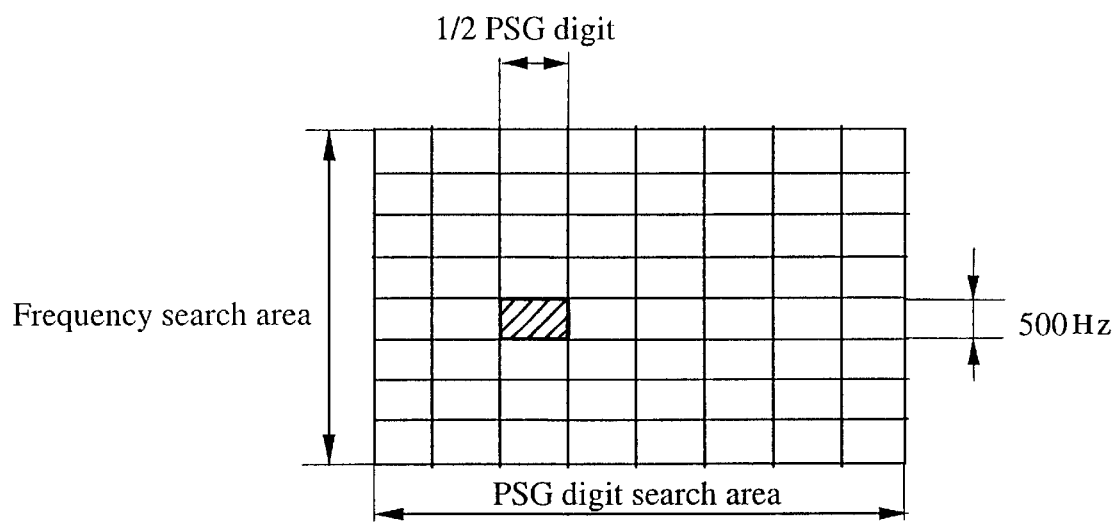
FIG. 1 illustrates the area of searching the signal in the SRNS receiver by frequency and delay.
Figure 2:
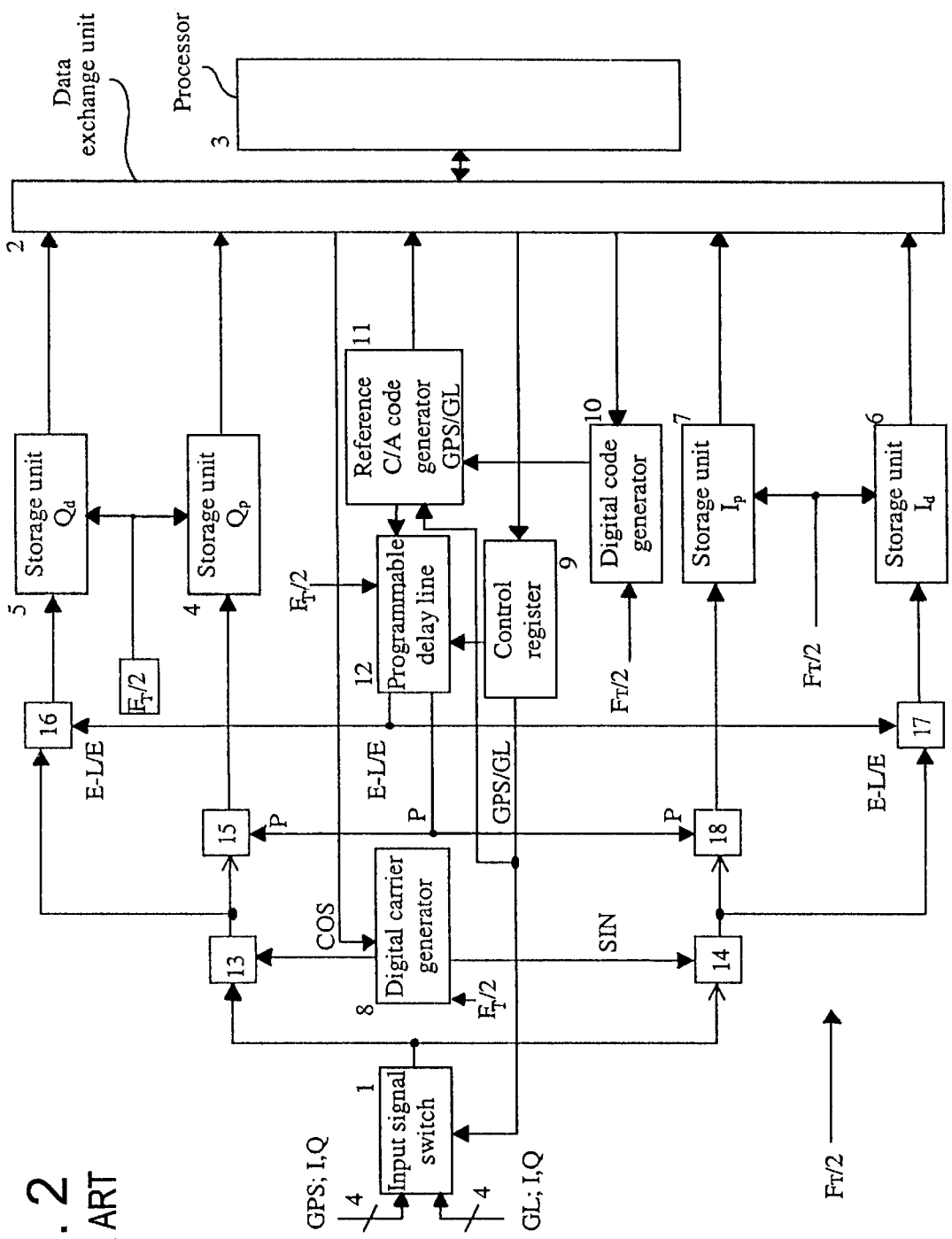
FIG. 2 is a block diagram of the prior art device.
Figure 3:
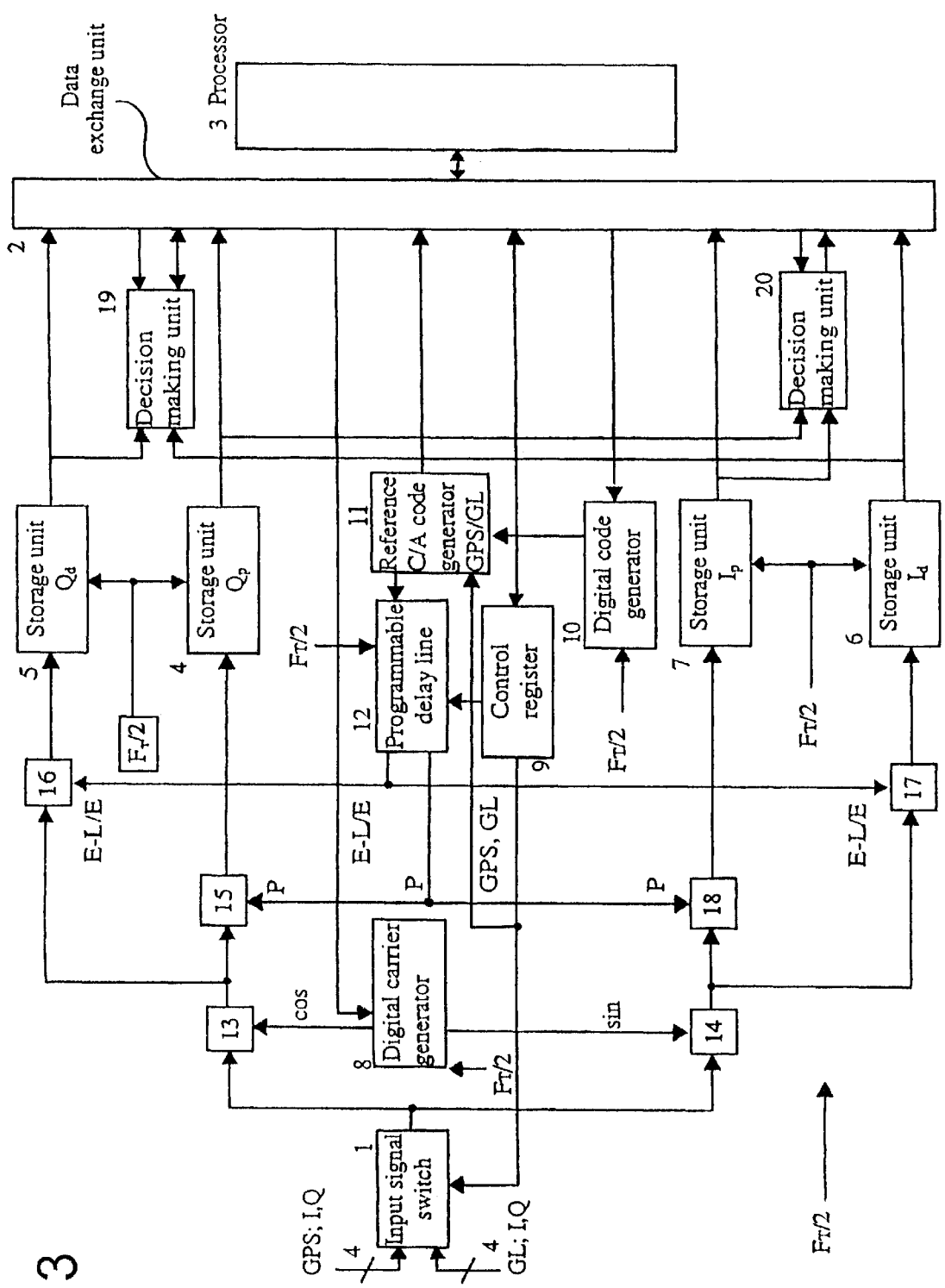
FIG. 3 is a block diagram of a device according to the present invention.
Figure 4:
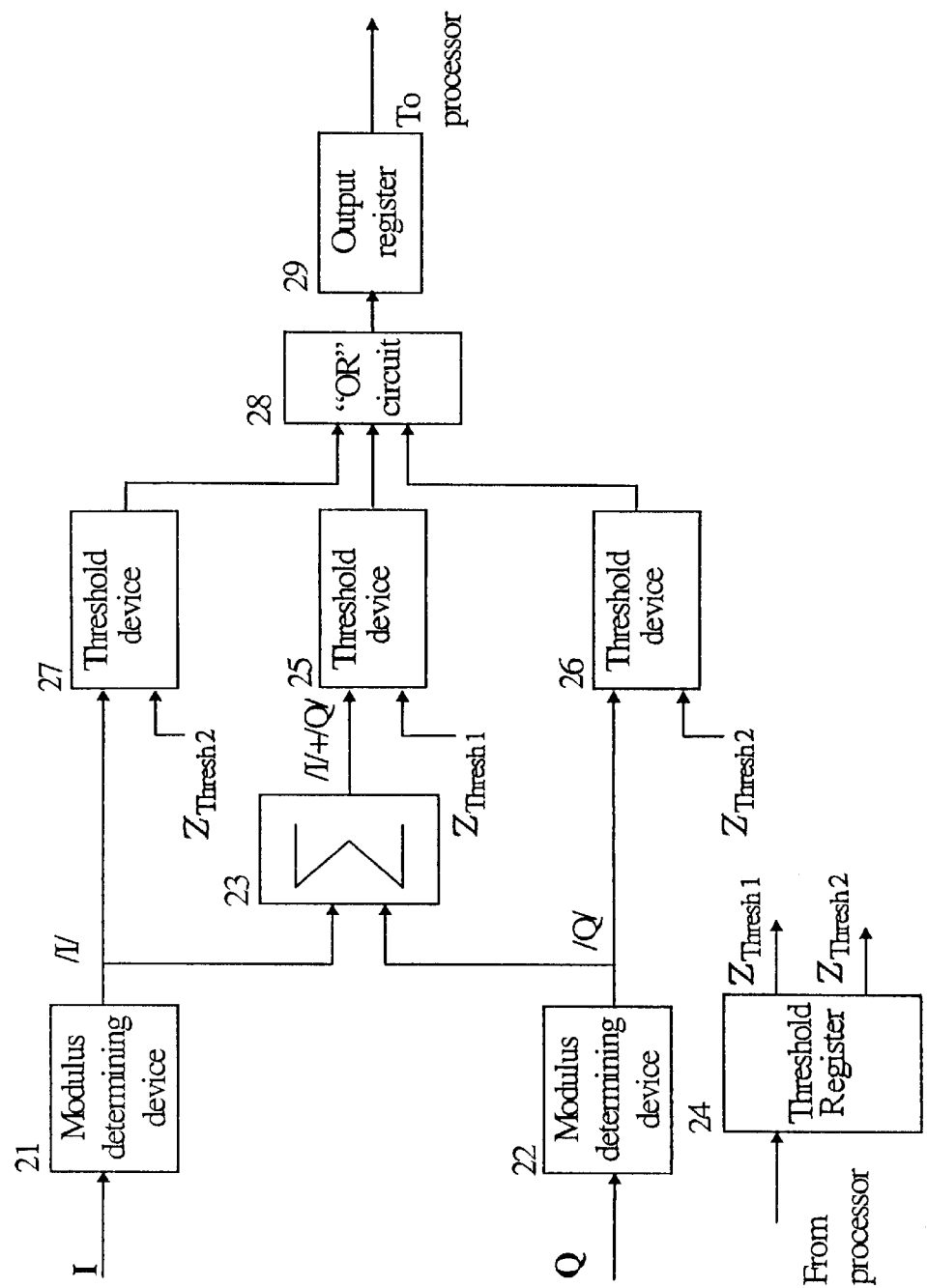
FIG. 4 is a block diagram of the decision making unit of a device according to the present invention.

The claimed digital correlator of the SRNS signal receiver (see FIG. 3) comprises a switch 1 for switching the input signals, a data exchange unit 2, a processor 3, and a first 4, a second 5, a third 6 and a fourth 7 storage units, a digital carrier generator 8, a control register 9, a digital code generator 10, a reference C/A code generator 11 of the SRNS GPS/GLONASS, a programmable delay line 12, a first digital mixer 13 and a second digital mixer 14 of the inphase and quadrature correlation processing channels, a first demodulator 15, a second demodulator 16, a third demodulator 17 and a fourth demodulator 18. The first and second inputs of the switch 1 (the inputs of the GPS and GLONASS) form signal inputs of the digital correlator. The clock inputs of the storage units 4–7, of the digital code generator 10, of the digital carrier generator 8 and of the programmable delay line 12 form a clock input of the digital correlator. The data exchange unit is connected to the appropriate data buses of the processor 3, and also to the outputs of the storage units 4–7, to the control inputs of the digital carrier generator 8, control register 9, digital code generator 10 and reference C/A code generator of the SRNS GPS and GLONASS. The control input of the switch 1 for switching the input signals is connected to the first output of the control register 9, and its output is connected to the first inputs of the digital mixers 13 and 14 of the inphase and quadrature correlation processing channels. The second inputs of the digital mixers 13 and 14 are connected, respectively, to the "cosine" and "sine" outputs of the digital carrier generator 8 and the outputs to the junction between the first demodulator 15, the second demodulator 16 and to the junction between the first inputs of the third 17 and the fourth demodulator 18 whose outputs are connected, respectively, to the signal inputs of a first storage unit 4, a second storage unit 5, a third storage unit 6 and a fourth storage unit 7. The second inputs of the first demodulator 15 and the fourth demodulator 18 are connected to the output of the punctual copy "P" of the reference C/A code of the programmable delay line 12. The second inputs of the second demodulator 16 and the third demodulator 17 are connected to the output of the difference "E-L" or early "E" copy of the reference C/A code of the programmable delay line 12. The signal input of the programmable delay line 12 is connected to the output of the reference C/A code generator of the SRNS GPS and GLONASS, whose signal input is connected to the output of the digital code generator 10. The control input of the reference C/A code generator of the GPS and GLONASS satellite radio navigation systems and the control input of the programmable delay line 12 are connected, respectively, to the first and second outputs of the control register. According to the invention, digital correlator of the SRNS signal receiver has additional decision making units: a first unit 19 and a second unit 20 whose control inputs and outputs are connected through buses to the data exchange unit 2, the first and second signal inputs of the decision makings unit 19 being connected, respectively, to the outputs of the second 5 and third 6 storage units, and the first and second signal inputs of the decision making unit 20 being connected to the outputs of the first 4 and fourth 7 storage units, respectively. Each of the decision making units 19, 20 (FIG. 4) comprises a first 21 and a second 22 modulus determining devices, an adder 23, a threshold register 24, a first 25, a second 26 and a third 27 threshold devices, an "OR" circuit 28 and an output register 29. The inputs of the modulus determining devices 21 and 22 are respectively the first and second signal inputs of the decision making unit, the input of the threshold register 24 is its control input, and the output of the register 29 is its output. The inputs of the adder 23 are connected to the outputs of the modulus determining devices 21, 22. The signal inputs of the first 25, second 26 and third 27 threshold devices are connected, respectively, to the output of the adder 23 and to the outputs of the first 21 and second 22 modulus determining devices. The reference input of the first threshold device 25 is connected to the first output of the threshold register 24, the reference inputs of the second 26 and third 27 threshold devices are connected to the second output of the threshold register 24. The outputs of threshold devices 25–27 are connected to the input of the output register 29 through the "OR" circuit 28.

The operation the digital correlator of the SRNS signal receiver according to the invention will be considered in view of an example of processing the signals produced in the receiver described in [5] at the output of its radio-frequency converter including a digitizer. In the considered example the two-bit samples of the inphase (I) and quadrature (Q) components of the on inputs GPS and GLONASS signals are applied to the signal inputs 6 of the switch 1 of the SRNS GPS and GLONASS at a sampling rate of $F_T/2$ (28.5 MHz). Having received the command of the processor 3 through the control register 9 of the data exchange unit 2, the switch 1 for switching the input signals 4 produces at its output two-bit quadrature SRNS GPS or GLONASS signals (I and Q). These signals act on the first inputs of the digital mixers 13 and 14 whose second inputs receive the "COS" and "SIN" reference-frequency signals from the respective outputs of the digital carrier generator 8. The digital carrier generator 8 produces IF signals "SIN" and "COS" of a preset SRNS GLONASS letter with a binary code formed by the processor 3, or intermediate-frequency signals SRNS GPS. At the sampling rate of $F_T/2=28.5$ MHz, the values of the intermediate frequencies of SRNS GPS or GLONASS signals lay in a range of ±14.25 MHz. The digital mixers 13 and 14 provide extraction of the SRNS GLONASS signals of a given letter or the signals of the SRNS GPS satellites and transfer the spectra of these signals in the base frequency band (on the zero frequency). From the outputs of the digital mixers 13 and 14 the signals are applied to the first inputs of the demodulators 15, 16 and 17, 18. Applied to the second inputs of the demodulators 15, 18 and 16, 17 are respectively the punctual (exact) "P" and difference "E-L" (Early-Late) or early "E" (Early) copies of the reference C/A code of the SRNS GPS or GLONASS from the respective outputs of the programmable delay line 12. The digital demodulators 15, 18 and 16, 17 perform correlation of received signals with punctual (exact) "P" and difference "E-L" (Early-Late) or early "E" copies of the reference C/A code of the SRNS GPS or GLONASS respectively. These code copies are produced by the programmable delay line 12, which allows the spacing between the early and late copies of the C/A code to be varied from 0.1 to 1 length of the digit of the C/A code and, hence, to shape a "narrow discriminator" in the system for tracing the SRNS receiver code (cf. A. J. Van Dierendonck., Pat. Fenton and Tom Ford. "Theory and Performance of Narrow Correlator Spacing in a GPS Receiver", Navigation, Journal of the Institute of Navigation, Vol.39, No.3,1982) [6]. The programmable delay line 12 processes the signals fed from the output of the generator 11 of the C/A reference code of the SRNS GPS/GLONASS, generating the reference pseudorandom C/A codes of the SRNS GPS or GLONASS satellites. The clock signal at a frequency of 1.023 MHz necessary for operation of the generator 11 for the GPS or 0.511 MHz for the GLONASS is fed to its signal input from the output of the digital code generator 10. The choice of a type of the produced pseudorandom code sequence and the values of the code clock rate depends on the commands to be generated by the processor 3 acting through the data exchange unit 2. The results of correlation of the signals are stored in the storage unit 4–7. In the case of operation with the punctual and difference copies of the input signal, the unit 4 stores the quadrature component of correlation of the punctual copy of Qp signal, the unit 5 stores the quadrature component of correlation of the difference copy Qd, the unit 7 stores the inphase component of the punctual copy Ip, the unit 6 stores the inphase component of the difference copy Id. The data stored in the storage units 4–7 are periodically read out through the data exchange unit 2 by means of the processor 3, which provides all algorithms of signal processing, i.e. the algorithms of searching the signals, tracing the carrier and code, and receiving the service information. The storage period is equal to the C/A code period, i.e. 1 ms. Using the signal processing results, the processor 3 controls the digital correlator by sending the estimated values of the carrier frequency to the digital carrier generator 8 and sending the value of the code clock rate to the digital code generator 10.

In the above considered part the operation of the digital correlator of the SRNS signal receiver according to the invention is similar to the operation of the prior art device. A new feature compared to prior art device is a possibility of realization of the "fast search" mode in the hardware part of the digital correlator according to the invention with the help of the decision makings units 19, 20 generating the detection signals. These signals are then read out by the processor 3 through the data exchange unit 2 that allows one to perform the mode of "fast search" of signals in addition to the usual "slow search" mode based the software used in the processor 3. In so doing the fast search is intended for detection of strong signals and the slow search is switched on only in the case of unsuccessful completion of the fast search. The application of the algorithm of searching the signals in the technical solution according to the invention is stipulated by the following.

It can be seen that, the maximum search time is spent for making a decision on the absence of a signal since the signal can be only in one position. Therefore, the most effective way of reducing the time of searching the signal is to reduce the time spent when making a decision on the absence of a signal in the given position (rejected time). Therefore, at the first stage an assumption is made on the presence of a strong signal, for which the "fast search" is effected (the rejection time at the thresholds calculated for a strong signal is much shorter) and, if no signal is detected, the search is repeated for the thresholds for the signal with a minimum level ("slow search"). The application of this algorithm is especially useful taking into account that the "signal-to-noise" ratio is much higher than the minimum permissible value. It can be shown that, for a signal with the minimum energy potential under the preset acquisition probabilities of detection and false procedure, the rejection time in each position takes about 4 milliseconds. Thus, the "slow search" time is approximately four times larger than the "fast search" time. It is evident that in the worst case the common search procedure including two steps ("fast" and "slow") is only by 25% longer than the process in which the "slow search" would be applied at once. On completing the "fast search", the time gain is 75% compared to the single-step procedure.

Let us consider the realization of the above two-step search procedure in the digital correlator of the SRNS signal receiver according to the present invention. Stemming from a priori ambiguity of location of a signal, the processor 3 gives out an initial search position by means of the data exchange unit 2, i.e. presets the carrier frequency for the digital carrier generator 8 and a code frequency for the digital code generator 10, as well as the location of the punctual and early copies of the reference C/A code of the SRNS GPS or GLONASS system with the help of the control register 9. Then, after 1 millisecond from the beginning of data accumulation, the processor 3 reads out the information from the decision making units 19, 20. If the signal is detected, the procedure of confirmation is carried out and after it has been completed, a decision is made on whether the searching procedure should be terminated or continued. If no signal is detected after the last point of the search spacing, the "slow search" procedure is carried out. The "slow search" is effected in the same spacing as the fast search as follows. The processor 3 sets the initial search position by means of the unit 2, i.e. sets a carrier frequency in the digital carrier generator 8 and a code frequency for the digital code generator 10 and location of the punctual and early copies of the reference C/A code of the SRNS GPS or GLONASS system through the control register 9. Then, after 1 ms for the start of data accumulation, the processor 3 reads out the information from all storage units 4–7. Then the processor 3 processes the stored data using the internal algorithm and makes a decision on the presence or absence of a signal in the given positions. During this process the operation of the decision makings units 19, 20 (FIG. 4) is carried out as follows.

Figure 5:
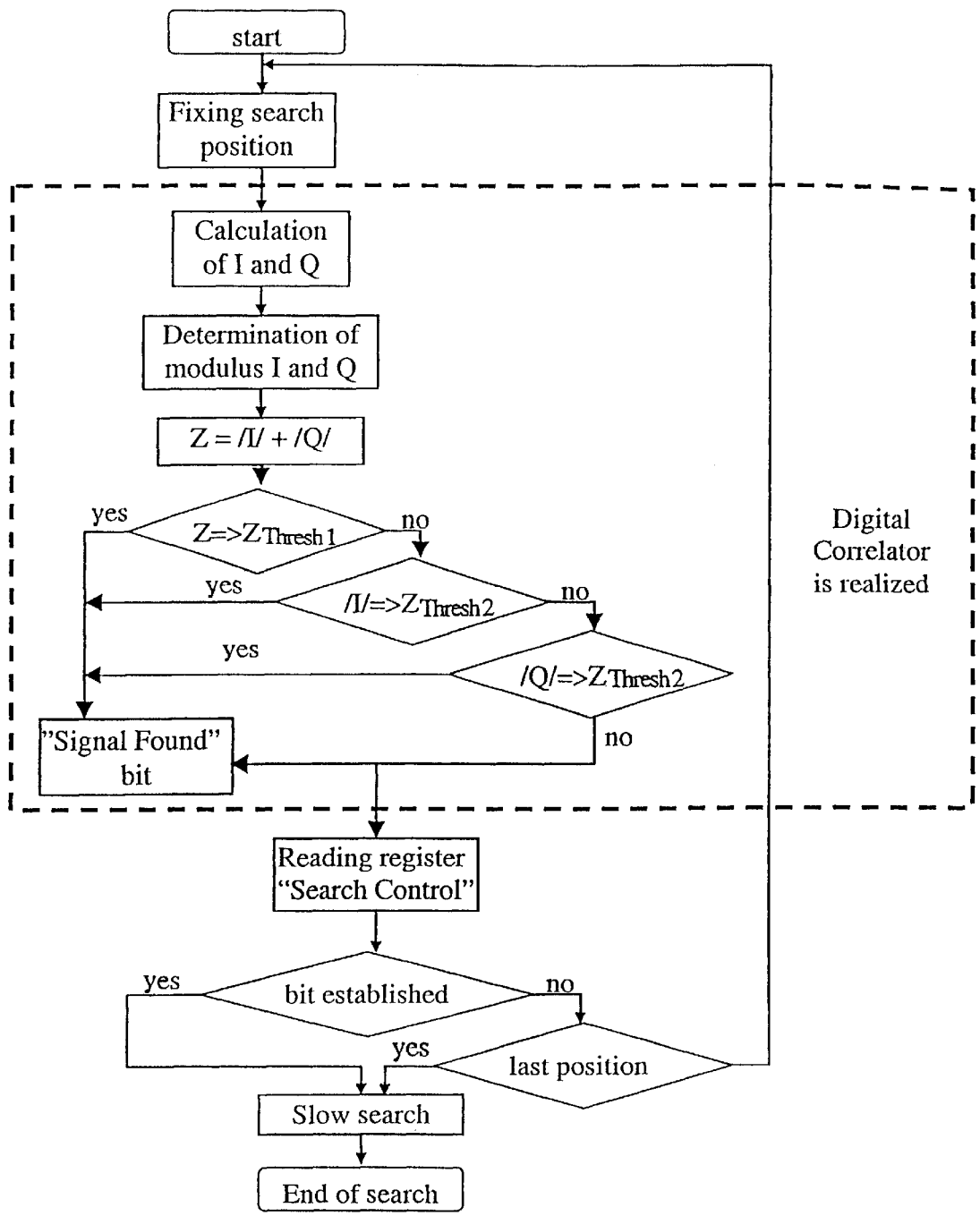
FIG. 5 shows the algorithm of the two-step search operation in a device according to the present invention.

Before starting the search procedure, the processor 3 with the help of the data exchange unit 2 load into the threshold register 24 the threshold values, which are determined proceeding from the required probabilities of a false alarm and detection used in the SRNS signal receiver with the analog-digital conversion and method of encoding the input samples and the sampling rate. The modulus determining devices 21, 22 get the results of the inphase and quadrature accumulation in the storage unit 5, 6 (or 4, 7), respectively, where their modulus is determined. The adder 23 gives out the sum of /I/ and /Q/ magnitudes. The threshold devices 25–27 compare /I/, /I/+/Q/ and /Q/ with the thresholds $Z_{thresh2}$, $Z_{thresh}$ and $Z_{thresh}$, respectively. If the threshold is exceeded, the threshold devices produce a signal with a level corresponding, for example, to the "logic 1" level, otherwise, they produce a signal having a "logic 0" level. If even one signal with the level "1" is present at the input of the "OR" circuit 28, a signal "1" is produced at the output of this circuit which indicates that the signal is detected. If otherwise, the "0" signal is produced at the output of the "OR" circuit 28. The output signal of the "OR" circuit 28 is recorded in the output register 29 and its value is read out by the processor 3 through the data exchange unit 2. After the signal value has been read, the register 29 is reset. The above-described sequence of operations during the two-step search is illustrated in the diagram of the two-step search algorithm (FIG. 5). As it is evident from this search algorithm, the "fast search" mode is realized in the hardware part of the claimed digital correlator with the help of the decision making units 19 and 20. If necessary, the "slow search" procedure is then carried out in the processor 3.

According to the practical experience, in most cases the received signals are strong enough, that allows their detection already at the "fast search" step. The scheme of making a decision on the presence of a signal in the given position during 1 ms is based on such signals. In so doing, to simplify the circuitry, use is made of not the optimal quadrature locator:

$$Z_{optimum} = \sqrt{I^2 + Q^2} \geq Z_{threshold} \quad (1)$$

but of more simple modular locator realizing algorithm selected, for example, from the following group of algorithms:

$$Z_{modular1} = |I| + |Q| \geq Z_{threshold\_modulus1} \quad (2)$$

$$Z_{modular2a} = |I| \geq Z_{threshold\_modulus2}$$

or $$Z_{modular2b} = |Q| \geq Z_{threshold\_modulus2}; \quad (3)$$

$$Z_{modular1} = |I| + |Q| \geq Z_{threshold\_modulus1}$$

$$Z_{modular2a} = |I| \geq Z_{threshold\_modulus2} \quad (4)$$

or $$Z_{modular2b} = |Q| \geq Z_{threshold\_modulus2} \quad (4)$$

Figure 6:
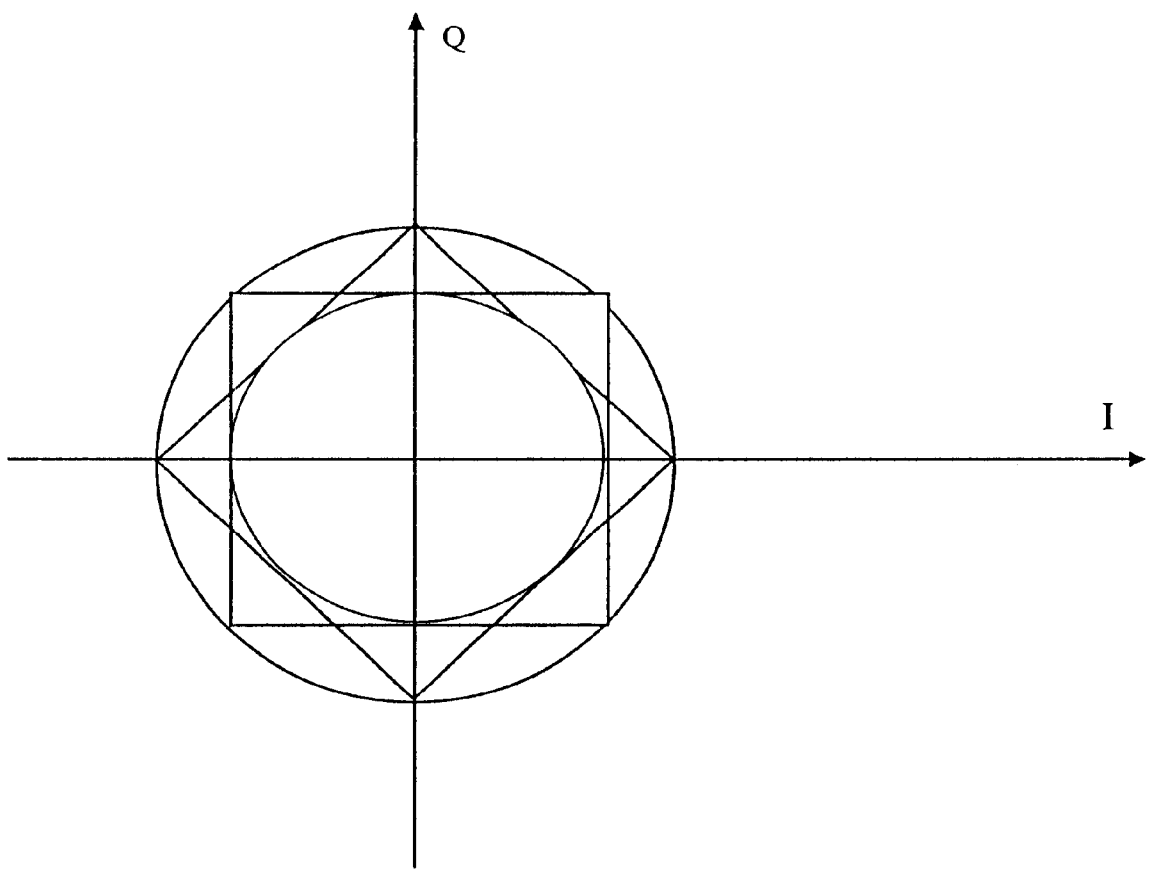
FIG. 6 is a graphic view of the decision making areas for optimal and modular detectors.

The choice of a concrete type of the algorithm of detection and the assignment of the "fast search" to the hardware part of the digital correlator and the "slow search" to the programmable part is stipulated, in particular, by the following. FIG. 6 shows the decision making areas for the optimal and modular locators. For the optimal locator it is a circle, for the modular algorithms (2, 3) it is a square and for (4) it is an octagon. Thus, the closer the decision making area to the circle, the closer the locator characteristics to the optimum. However, in this case the use of more complex modular algorithms does not result in a significant power gain in comparison with (4).

During process of decision making for 1 ms the incoherent accumulation is no longer needed, thus allowing one to realize the search circuitry in rather a simple way. On the other hand, when searching a weak signal, the incoherent accumulation is necessary, which requires high-capacity storage devices, 1-ms adders and a threshold correction device. It is obvious that it is inexpedient to realize such a circuit in the hardware part of the digital correlator for the following reasons: a large volume of equipment; the probability of application of slow search is low, and, therefore, the given equipment will not be used; it is necessary to use the optimal quadrature locator, algorithm (1), with the realization of the sum $Z = Z_E + Z_L \geq Z_{threshold\_e+1}$ which makes it possible to take into account the step increment in the search period delay. Let us define the minimum level of signals, which will be detected during the "fast search" by the claimed device with omission probability $\beta = 0.01$ and false alarm $\alpha = 0.0005$, which are typical values. In so doing, firstly we use the algorithm (1). Since Z can be considered as a vector length with independent normal components I and Q (cf. the book "Search, Detection and Measurement of Parameters of Signals in Radio Navigation Systems", edited by M. Kazarinov, Moscow, "Sovetskoe Radio", 1975) [7], its probability density in the absence of a signal will be given by the Raleigh law.

$$W_n(Z) = \frac{2Z}{N_0 E} \exp\left(-\frac{Z^2}{N_0 E}\right),$$

and in the presence of a signal it is generalized by the Raleigh law $$W_s(Z) = \frac{2Z}{N_0 E} \exp\left(-\frac{Z^2 + E^2}{N_0 E}\right) I_0\left(\frac{2Z}{N_0}\right),$$

with parameter $E = \sqrt{(\overline{I_s})^2 + (\overline{Q_s})^2}$ and $N_0$ being noise, where $I_0$ is the Bessel function of the zero order. $\overline{I_s}$, $\overline{Q_s}$ are mean values of quadratures in the presence of a signal. From here for the error probability we have:

$$\alpha = \int_{Z_{theshold}}^{\infty} \frac{2Z}{N_0 E} \exp\left(-\frac{Z^2}{N_0 E}\right) dZ = \exp\left(-\frac{R^2}{2}\right);$$

$$\beta = \int_{0}^{Z_{threshold}} \frac{2Z}{N_0 E} \exp\left(-\frac{Z^2 + E^2}{N_0 E}\right) I_0\left(\frac{Z}{\sqrt{\frac{N_0 E}{2}}} \sqrt{\frac{2E}{N_0}}\right) dZ = Q(R, q),$$

where $$R = \frac{Z_{threshold}}{\sqrt{N_0 E/2}}$$

is the threshold normalized by the effective value.

$$Q(u, v) = \int_0^u t \exp\left(-\frac{t^2 + v^2}{2}\right) I_0(vt) dt -$$

is the Raleigh-Rician distribution;

$$q = \sqrt{\frac{2E}{N_0}} -$$

is the signal-to-noise ratio at the matched filter output.
For the above-mentioned probabilities of errors, using the data from the publications available (cf. "Handbook on Probability Calculations", Moscow, 1970. By G. G. Abegauz, A. A. Tron, Yu. N. Kopenkin, I. A. Korovina)[8], we get q≈5.2. The transfer from optimal to the modular locator results in energy losses which are characterized in following parameter:

$$\xi = (q_{mod}/q)^2 - 1$$

Where q and $q_{mod}$ are threshold values for the signal/noise ratio for optimum and modular locators respectively.

The parameter $\xi$ depends on the required parameters of detection. For the modular algorithms (2,3) with preset $\alpha$ and $\beta$ the losses make up to 0.7 dB and higher and drastically toughen the requirements to the locator, while the locator based on the algorithm (3) has much lower losses, which are practically independent on the locator parameters $\alpha$ and $\beta$ described in [7]. Therefore it is reasonable to use this algorithm. For the proposed type of the modular locator and preset detection characteristics $\xi$0.0067, and this leads to the required $q_{mod}$≈5.217. Determine the required energy potential at the output of the radio-frequency converter of the receiver of the SRNS signals:

$$L = \frac{P}{N_0} = \frac{q_{mod}^2}{2T_{accumulation}},$$

where $T_{accumulation}$ is the predetector accumulation time.

During the accumulation within the time spacing of 1 ms L≈41.3 dB. At the greatest losses at a search in the digital correlator of about 3.4 dB and analog-digital conversion from 0.56 up to 0.91 dB (for 3 and 4-level analog-digital conversion, respectively) with the above-mentioned error probabilities, it is guaranteed that signals with an energy potential at the output of the radio-frequency converter of the receiver of the SRNS signals L≈45.5 dB*Hz will be detected. According to the data given in the "Global Positioning System: Theory and Applications", edited by Bradford W. Parkinson, James J. Spilker Jr. USA, 1995 [9], the minimum energy potential of the GPS C/A code for the typical receiver under typical operating conditions makes 45.2 dB, and for the new satellites whose output power is by 6 dB higher, than listed in the specification the energy potential can reach 51.5 dB*Hz. It is obvious, that the "fast search" under standard operating conditions of the equipment will ensure reception of signals practically of all SRNS satellites, i.e. the search of signals will be effected with a minimum power consumption of the processor. In the same way, by concentrating our efforts on the search of a strong signal, we practically exclude the capture its side lobes both in frequency and time thus also reducing the time for the signal recovery.

Industrial Applicability

From the above description it is clear that the present invention is feasible, industrially applicable, as it is based on the available engineering facilities, solves the formulated technical problem, allows one to use inexpensive processors due to a low computing load, can be used in the structure of a miniaturized integrated equipment operating simultaneously on the SRNS GPS and GLONASS signals, and is compatible with other navigational and/or communication means using common computing resources.

What is claimed is:

1. A digital correlator of a receiver for reception of signals of satellite radio navigation systems comprising:

an input signal switch whose inputs form signal inputs of the digital correlator;

a digital carrier generator;

a processor;

first and second digital mixers of inphase and quadrature correlation processing channels, respectively;

first, second, third and fourth demodulators;

first, second, third and fourth storage units;

a reference C/A code generator of GPS/GLONASS satellite radio navigation systems;

a control register;

a programmable delay line;

a digital C/A code generator of GPS/GLONASS satellite radio navigation systems;

a data exchange unit connected through respective buses to the processor, to outputs of the first, the second, the third and the fourth storage units, to control inputs of the digital carrier generator, to the control register, and to the digital C/A code generator of the GPS/GLONASS satellite radio navigation systems; and first and second decision making units;

wherein clock inputs of the first, second, third and fourth storage units, clock inputs of the digital C/A code generator, clock inputs of the digital carrier generator and clock inputs of the programmable delay line form a clock input of the digital correlator;

a control input of the input signal switch is connected to a first output of the control register;

an output of the input signal switch is connected to first inputs of the first and second digital mixers, second inputs of the first and second digital mixers are connected, respectively, to cosine and sine outputs of the digital carrier generator, and the outputs of the first and second digital mixers are connected, respectively, to a junction between first inputs of the first and second demodulators and to a junction between first inputs of the third and fourth demodulators, outputs of the first, second, third and fourth demodulators are connected, respectively, to the signal inputs of the first, second, third and fourth storage units, second inputs of the first and fourth demodulators are connected to an output of a punctual copy of a reference C/A code of the programmable delay line, second inputs of the second and third demodulators are connected to at least one of an output of a difference copy, the difference copy being equal to a difference between an early and a late copy of the reference C/A code of the programmable delay line, and an output of the early copy of the reference C/A code of the programmable delay line, a signal input of the programmable delay line is connected to an output of the reference C/A code generator of the GPS/GLONASS satellite radio navigation systems, a signal input of the reference C/A code generator of the GPS/GLONASS satellite radio navigation systems is connected to an output of the digital C/A code generator, a control input of the reference C/A code generator of the GPS/GLONASS satellite radio navigation systems and a control input of the programmable delay line are connected, respectively, to first and second outputs of the control register, control inputs and outputs of the first and the second decision making units are connected through corresponding buses to the data exchange unit, first and second signal inputs of the first decision making unit are connected, respectively, to outputs of the second and third storage units, first and second signal inputs of the second decision making unit are connected, respectively, to outputs of the first and fourth storage units, each of the first and second decision making units comprises:
  a first modulus determining device and a second modulus determining device, inputs of the first modulus determining device and the second modulus determining device form, respectively, the first signal input and the second signal input of the decision making unit,
  an adder whose inputs are connected to outputs of the modulus determining devices,
  a register of thresholds whose input forms the control input of the decision making unit,
  first, second and third threshold devices whose signal inputs are connected, respectively, to an adder output and to outputs of the first and second modulus determining device, a reference input of the first threshold device being connected to a first output of the register of thresholds, reference inputs of the second and third threshold devices are connected to a second output of the register of thresholds, the outputs of the first, the second and the third threshold devices are connected through an OR circuit to an input of a detection signal shaper whose output is an output of the decision making unit.

2. A digital correlator of a receiver for reception of signals of satellite radio navigation systems comprising:
  an input which receives signals of satellite radio navigation systems;
  a processor;
  a data exchange unit connected to the processor; and
  at least one decision making unit, connected to the data exchange unit, the decision making unit generating detection signals indicative of a strength of the received signals of satellite radio navigation systems;
  whereby the processor performs a fast search for detection of strong signals, and performs slow search only when signals were not detected during the fast search.

3. The digital correlator as claimed in claim 2, wherein the decision making unit comprises:
  a first modulus determining device and a second modulus determining device, inputs of the first modulus determining device and the second modulus determining device form, respectively, first signal input and second signal input of the decision making unit,
  an adder whose inputs are connected to outputs of the modulus determining devices,
  a register of thresholds whose input forms a control input of the decision making unit,
  first, second and third threshold devices whose signal inputs are connected, respectively, to an adder output and to outputs of the first and second modulus determining device, a reference input of the first threshold device being connected to a first output of the register of thresholds, reference inputs of the second and third threshold devices are connected to a second output of the register of thresholds, the outputs of the first, the second and the third threshold devices are connected through an OR circuit to an input of a detection signal shaper whose output is an output of the decision making unit.

4. The digital correlator as claimed in claim 2, wherein the received signals are signals of GPS and GLONASS satellite radio navigation systems.

* * * * *